US010652125B2

(12) United States Patent
Zheng et al.

(10) Patent No.: US 10,652,125 B2
(45) Date of Patent: May 12, 2020

(54) SYSTEM AND METHOD FOR MANAGING MULTIPLE REMOTE-OFFICE AND BRANCH-OFFICE (ROBO) SITES

(71) Applicant: VMWare, Inc., Palo Alto, CA (US)

(72) Inventors: Qianyi Zheng, Shanghai (CN); Edward Xu, Shanghai (CN); Biwen Li, Shanghai (CN); Dao Tao, Shanghai (CN)

(73) Assignee: VMware, Inc., Palo Alto, CA (US)

( * ) Notice: Subject to any disclaimer, the term of this patent is extended or adjusted under 35 U.S.C. 154(b) by 347 days.

(21) Appl. No.: 15/091,489

(22) Filed: Apr. 5, 2016

(65) Prior Publication Data
US 2017/0289005 A1 Oct. 5, 2017

(51) Int. Cl.
*H04L 12/24* (2006.01)
*H04L 12/26* (2006.01)

(52) U.S. Cl.
CPC .......... *H04L 43/10* (2013.01); *H04L 41/0631* (2013.01); *H04L 43/0817* (2013.01)

(58) Field of Classification Search
None
See application file for complete search history.

(56) References Cited

U.S. PATENT DOCUMENTS

| | | | | |
|---|---|---|---|---|
| 7,451,359 B1* | 11/2008 | Coekaerts | ........... | G06F 11/0709 709/223 |
| 7,606,986 B1* | 10/2009 | Limaye | .................. | H04L 69/40 711/112 |
| 9,454,326 B1* | 9/2016 | Bono | ....................... | G06F 3/065 |
| 2012/0096169 A1* | 4/2012 | Oeda | ..................... | G06F 9/4856 709/226 |
| 2012/0226673 A1* | 9/2012 | Li | ..................... | G06F 17/30171 707/704 |
| 2013/0151558 A1* | 6/2013 | Chercoles S Nchez | ..................... | G06F 16/2471 707/770 |
| 2014/0059392 A1* | 2/2014 | Ren | ....................... | G06F 11/301 714/47.1 |
| 2015/0363424 A1* | 12/2015 | Strong | ............... | G06F 16/1844 707/634 |
| 2016/0371110 A1* | 12/2016 | Radhakrishnan | ... | G06F 9/45558 |

OTHER PUBLICATIONS

Rawlinson Rivera, "VMware Virtual San ROBO Edition—Virtual Blocks"; https://blogs.vmware.com/virtualblocks/2015/09/11/vmware-virtual-san-robo-edition/; posted on internet Sep. 11, 2015; 10 pgs.
Chen, Gary; "The Benefits of Virtualizing Remote and Branch Offices"; IDC White paper; Sep. 2014; 8 pgs.

* cited by examiner

*Primary Examiner* — Aaron N Strange
*Assistant Examiner* — Mohammad Yousuf A. Mian
(74) *Attorney, Agent, or Firm* — Loza & Loza, LLP (57) ABSTRACT

System and method for managing multiple Remote-office and Branch-office (ROBO) sites use a central management computer to monitor operation statuses of host computers within the multiple ROBO sites and in response to a communication disruption in a particular ROBO site of the multiple ROBO sites, determining a cause of the communication disruption based on the operation statuses of the host computers within the particular ROBO site.

26 Claims, 9 Drawing Sheets

SYSTEM AND METHOD FOR MANAGING MULTIPLE REMOTE-OFFICE AND BRANCH-OFFICE (ROBO) SITES

BACKGROUND

Organizations, such as retail, manufacturing, finance and healthcare businesses use Remote-office and Branch-office (ROBO) sites for various applications. For example, using ROBO sites, retail businesses can sell goods at stores, banks can distribute money, manufacturers can build goods in manufacturing sites and hospitals can serve patients.

However, ROBO sites typically lack local Information Technology (IT) staff, which makes data protection and recovery in remote sites hard to achieve. A two-node virtual storage area network (SAN) cluster with one witness node remotely in the headquarter of ROBO sites allows the ROBO sites to have High Availability (HA), data protection and recovery capabilities. The witness node is used to ensure that more than 50% of the components of an object remain available during a network partition or an object failure. However, in a two-node virtual SAN cluster with 1 witness node, each ROBO site needs one physical or virtual witness host, resulting in a large number of physical/virtual witness hosts when the number of their ROBO sites becomes large. For example, if a user has couple hundred ROBO sites, it would require a corresponding number (e.g., couple hundred) of physical/virtual witness hosts. If the user chooses to deploy physical witness hosts, the user needs to purchase hundreds of physical hosts and find an appropriate location to house the physical hosts, an adequate amount power to serve the physical hosts and a proper cooling system for the physical hosts. Alternatively, if the user chooses to deploy virtual witness hosts, the user needs to manage a large number of virtual witness hosts.

SUMMARY

System and method for managing multiple ROBO sites use a central management computer to monitor operation statuses of host computers within the multiple ROBO sites and in response to a communication disruption in a particular ROBO site of the multiple ROBO sites, determining a cause of the communication disruption based on the operation statuses of the host computers within the particular ROBO site.

A method for managing multiple ROBO sites in accordance with an embodiment of the invention comprises monitoring operation statuses of host computers within the multiple ROBO sites using a central management computer and in response to a communication disruption in a particular ROBO site of the multiple ROBO sites, determining a cause of the communication disruption using the central management computer based on the operation statuses of the host computers within the particular ROBO site. In some embodiments, the steps of this method are performed when program instructions contained in a computer-readable storage medium is executed by one or more processors.

A computer system for managing multiple ROBO sites in accordance with an embodiment of the invention comprises a central management computer. The central management computer is configured to monitor operation statuses of host computers within the multiple ROBO sites and in response to a communication disruption in a particular ROBO site of the multiple ROBO sites, determine a cause of the communication disruption based on the operation statuses of the host computers within the particular ROBO site.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
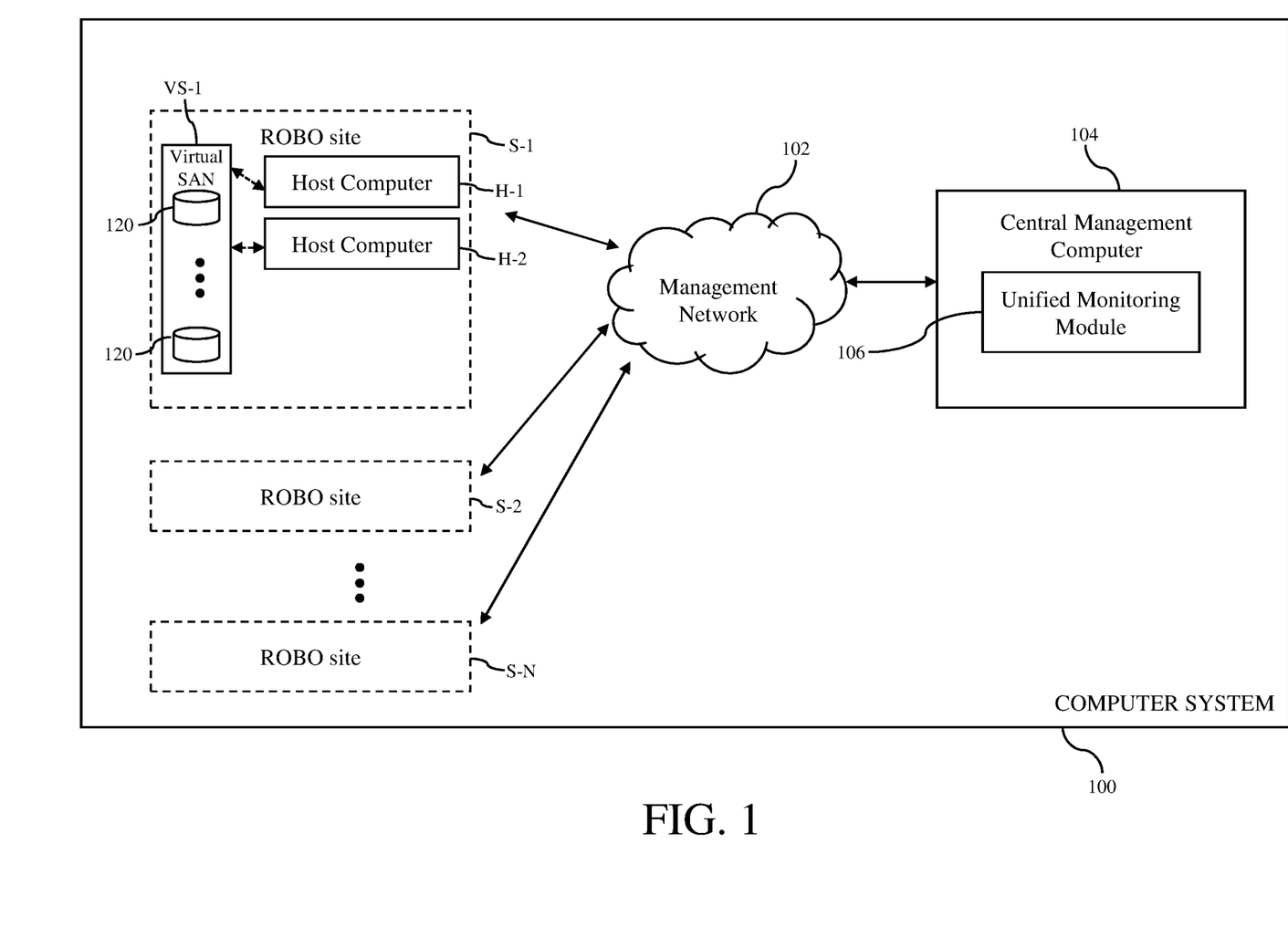
FIG. 1 is a block diagram of a computer system in accordance with an embodiment of the invention.

Turning now to FIG. 1, a computer system 100 in accordance with an embodiment of the invention is shown. The computer system may be, for example, a computer network system. As shown in FIG. 1, the computer system includes a management network 102, Remote-office and Branch-office (ROBO) sites S-1, S-2 ... S-N (where N is a positive integer), and a central management computer 104 with a unified monitoring module 106. The ROBO sites are used to support or host clients that can execute various applications. For example, the ROBO sites can be used for retail, manufacturing, finance, healthcare or other businesses to sell goods at stores, distribute money, build goods in manufacturing sites, serve patients or perform other business operations. The exact number of ROBO sites included in the computer system can be any number of ROBO sites from one to tens of ROBO sites or more.

In the illustrated embodiment, each of the ROBO sites S-1, S-2 ... S-N includes two host computers H-1, H-2. The host computers can be assigned to the ROBO sites based on predefined criteria, which may include geographical and/or logical relationships between the host computers. In some embodiments, the number of host computers included in each of the ROBO sites can be any number from one to several hundred or more. In addition, in some embodiments, the number of host computers included in each of the ROBO sites can vary so that different ROBO sites can have a different number of host computers. The host computers are physical computer systems that host or support one or more clients so that the clients are executing on the physical computer systems. As used herein, the term "client" is any software entity that can run on a computer system, such as a software application, a software process, a virtual machine (VM) and a "container" that provides system-level process isolation. The host computers may be servers that are commonly found in data centers. As an example, the host computers may be servers installed in one or more server racks. In an embodiment, the host computers of an ROBO site are located within the same server rack. In some embodiments, a ROBO site may include more than two host computers. For example, in one ROBO site with four host computers, two host computers may be placed in Fault Domain A while two other host computers may be placed in Fault Domain B. VMs are distributed in host computers within Fault Domain A and Fault Domain B. A VM executing on a host computer within Fault Domain A may have one component of an object hosted in Fault Domain A and have a replica component of the same object hosted on a host computer in Fault Domain B. The object owner of an object hosted in Fault Domain A may be on hosted in a host computer in Fault Domain A or a host computer in Fault Domain B. When a network partition happens between Fault Domain A and Fault Domain B, no action needs to be taken if a VM and its object owner are hosted on the host computers in the same Fault Domain. However, if a VM and its object owner are not hosted in the same Fault Domain, the host computer that originally owns the object of the VM releases the ownership role of the object and a host computer in the Fault Domain at which the VM resides takes the ownership role of the VM so that the VM can continue to operate without interruption.

The host computers H-1, H-2 of the different ROBO sites S-1, S-2 ... S-N may be connected to the central management computer 104 via the management network 102. Thus, host computers in each of the ROBO sites can communicate with the central management computer via the management network. Consequently, a process running on any of the host computers can access the central management computer via the management network. In some embodiments, some or all of the host computers H-1, H-2 of each of the ROBO sites S-1, S-2 ... S-N are connected to a virtual storage area network (SAN) VS-1. The virtual SAN is used to store data for the host computers of a particular ROBO site, which can be accessed like any other storage device connected to computer systems. In an embodiment, the virtual SAN can be accessed by entities, such as clients running on the host computers, using any file system, e.g., virtual machine file system (VMFS) or network file system (NFS). The virtual SAN includes one or more virtual storage devices 120, which can correspond to any type of storage devices, such as an electronic storage apparatus/device/system, a magnetic storage apparatus/device/system, an optical storage apparatus/device/system, an electromagnetic storage apparatus/device/system, an infrared storage apparatus/device/system, or a semiconductor storage apparatus/device/system or a combination of two or more of above-described storage apparatuses/devices/systems. Examples of the virtual storage devices include a virtual semiconductor or solid state memory, a virtual magnetic disk, a virtual magnetic tape, a virtual removable computer diskette, a virtual random access memory (RAM), a virtual read-only memory (ROM), a virtual rigid magnetic disc, and a virtual optical disc. At least some of the virtual storage devices of the virtual SAN may correspond to local storage devices of the host computers, e.g., locally attached disks or solid-state drives (SSDs) within the host computers. The computer data storage devices support multiple datastores, which may be virtualized representations of storage facilities. The datastores can be used to store data associated with the clients supported by the host computers of the ROBO sites. A datastore may be associated with a specific ROBO site. For VMs, the datastores may be used to store virtual storage, e.g., virtual disks, used by each of the VMs, as well as other files needed to support the VMs, such as configuration files for the VMs. One or more datastores may be associated with one or more host computers.

Figure 2:
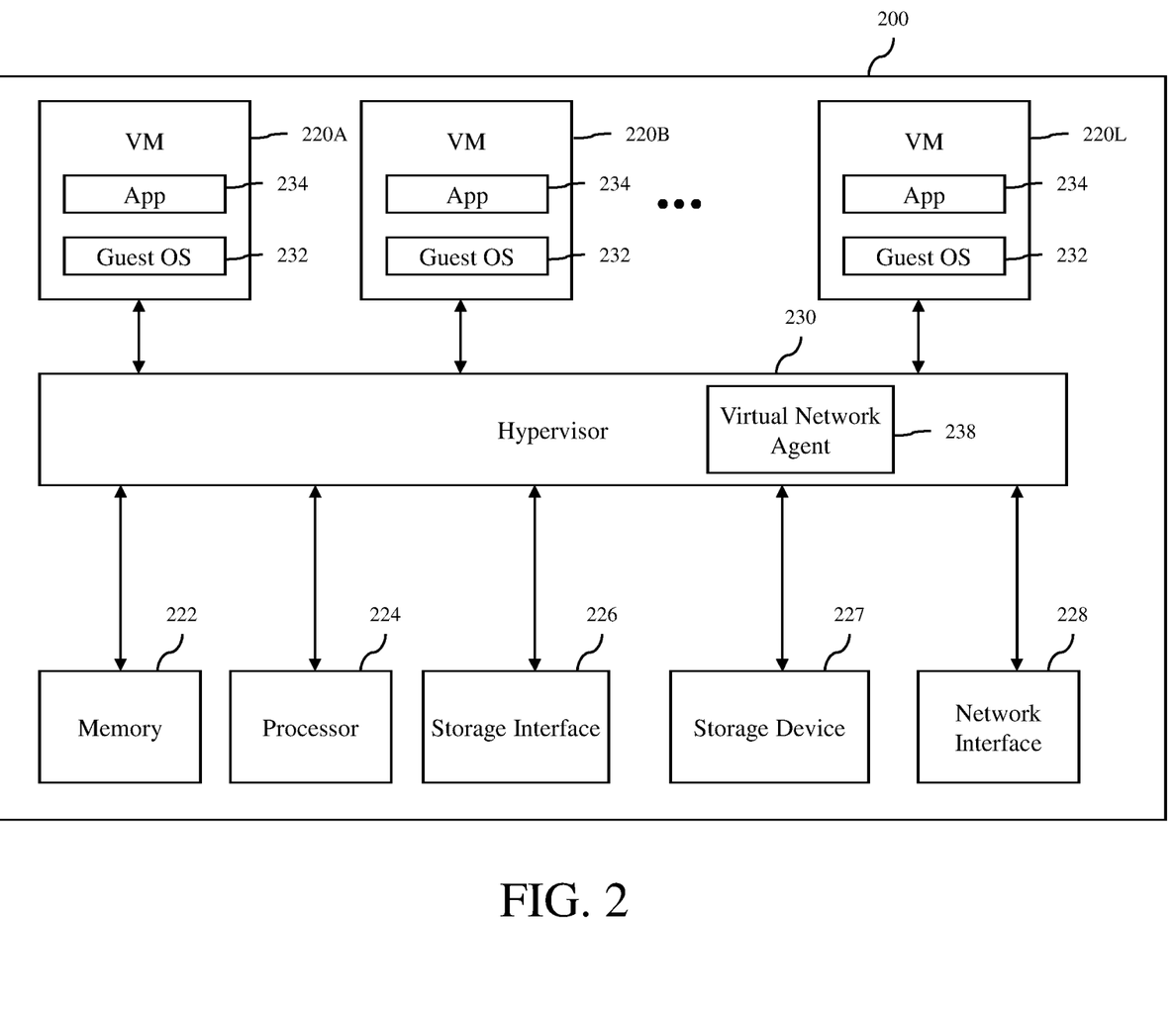
FIG. 2 is a block diagram of a host computer in accordance with an embodiment of the invention.

Turning now to FIG. 2, components of a host computer 200 that is representative of the host computers H-1, H-2 in the ROBO sites S-1, S-2 ... S-N in accordance with an embodiment of the invention are shown. In FIG. 2, the physical connections between the various components of the host computer are not illustrated. In the illustrated embodiment, the host computer is configured to support a number of clients 220A, 220B ... 220L (where L is a positive integer), which are VMs in this embodiment. The number of VMs supported by the host computer can be anywhere from one to more than one thousand. The exact number of VMs supported by the host computer is only limited by the physical resources of the host computer. The VMs share at least some of the hardware resources of the host computer, which include system memory 222, one or more processors 224, a storage interface 226, an optional storage device 227 and a network interface 228. The system memory, which may be random access memory (RAM), is the primary memory of the host computer. The processor can be any type of a processor, such as a central processing unit (CPU) commonly found on a server. The storage interface is an interface that allows that host computer to communicate with other storage entities. As an example, the storage interface may be a host bus adapter or a network file system interface. The storage device, which may be a disk or a flash drive, may be used to store large volume of data. The network interface is an interface that allows the host computer to communicate with other devices connected to the management network 102. As an example, the network interface may be a network adapter.

In the illustrated embodiment, the VMs 220A, 220B ... 220L run on "top" of a hypervisor 230, which is a software interface layer that enables sharing of the hardware resources of the host computer 200 by the VMs. However, in other embodiments, one or more of the VMs can be nested, i.e., a VM running in another VM. Any computer virtualization architecture can be implemented. For example, the hypervisor may run on top of the host computer's operating system or directly on hardware of the host computer. With the support of the hypervisor, the VMs provide virtualized computer systems that give the appearance of being distinct from the host computer and from each other. Each VM includes a guest operating system (OS) 232 and one or more guest applications (APP) 234. The guest operating system manages virtual system resources made available to the corresponding VM by the hypervisor 230, and, among other things, the guest operating system forms a software platform on top of which the guest applications run.

Similar to any other computer system connected to the network 102, the VMs 220A, 220B ... 220L are able to communicate with other computer systems connected to the network using the network interface 228 of the host computer 200. In addition, the VMs are able to access other storage entity (e.g., a virtual storage area network (SAN)) using the storage interface 226 of the host computer.

The host computer 200 may further include a virtual network agent 238, which operates within the hypervisor 230 to provide virtual networking capabilities, such as bridging, L3 routing, L2 switching and firewall capabilities, so that software defined networks or virtual networks can be created. In a particular embodiment, the virtual network agent may be part of a VMware NSX™ virtual network product installed in the computer system 100. In some embodiments, the virtual network agent is a virtual SAN device driver that provides access to a virtual SAN. By accessing APIs exposed by the virtual SAN device driver, the hypervisor can access data storage devices residing in the virtual SAN.

Turning back to FIG. 1, the management network 102 can be any type of computer network or a combination of networks that allows communications between devices connected to the network. The management network may include the Internet, a wide area network (WAN), a local area network (LAN), a storage area network (SAN), a fibre channel network and/or other networks. The management network may be configured to support protocols suited for communications with storage arrays, such as Fibre Channel, Internet Small Computer System Interface (iSCSI), Fibre Channel over Ethernet (FCoE) and HyperSCSI.

The central management computer 104 operates to manage the host computers H-1, H-2 of the ROBO sites S-1, S-2 ... S-N of the computer system 100. The management computer may be configured to generate, modify and/or monitor the current configurations of the host computers and the clients running on the host computers, for example, VMs. The configurations may include hardware configuration of each of the host computers, such as CPU type and memory size, and/or software configurations of each of the host computers, such as operating system (OS) type and installed applications or software programs. The configurations may also include clustering information, i.e., which host computers are included in which clusters, client hosting information, i.e., which clients, e.g., VMs, are hosted or running on which host computers and/or client information. In some embodiments, the central management computer may be a physical computer including at least memory and one or more processors, similar to the host computer 200. In an implementation, the central management computer is a VMware® vCenter™ server.

The unified monitoring module 106 communicates with all host computers H-1, H-2 of the ROBO sites S-1, S-2 ... S-N via the management network 102. In an embodiment, the unified monitoring module may be configured to perform various operations to manage the multiple ROBO sites S-1, S-2 ... S-N of host computers. Compared to an approach of managing each ROBO site that uses one particular monitoring module, which results in employing hundred of monitoring modules for the same amount of ROBO sites, the unified monitoring module can manage multiple ROBO sites (e.g., from two ROBO sites to several hundred or more ROBO sites). Consequently, compared to the approach of managing each ROBO site that uses one particular monitoring module, the unified monitoring module can be implemented in one host computer as one hardware or software module, which reduces hardware and management costs.

As an example, the unified monitoring module 106 may be configured to monitor operation statuses of host computers H-1, H-2 within the multiple ROBO sites S-1, S-2 ... S-N. The operation statuses of the host computers include information regarding the operation of the host computers. The operation statuses of the host computers may include processing statuses of the host computers and/or network statuses of the host computers. For example, an operation status of a host computer may include a processing status of the host computer (e.g., whether the host computer is operating normally or a host computer failure has occurred) and/or a network status of the host computer (e.g., whether or not the host computer is reachable or whether or not a communication connection between the host computer and another host computer within the same ROBO site is broken). The unified monitoring module may be configured to, in response to a communication disruption in an ROBO site, determine a cause of the communication disruption based on the operation statuses of the host computers within the ROBO site. As an example, the unified monitoring module may be configured to determine whether a network partition or a host computer failure has occurred in the ROBO site. The unified monitoring module can be implemented by hardware, software or a combination of hardware and software. In some embodiments, the unified monitoring module may be implemented as one or more software program running on one or more physical computers, such as one or more software program running on the host computer 200 shown in FIG. 2, or one or more virtual computer, such as the VMs 220A, 220B . . . 220L. In a particular implementation, the unified monitoring module is installed in a VMware vCenter™ server that is executed by one or more processors of the server. However, in other embodiments, the unified monitoring module may be installed in any other component in the computer system 100.

Figure 3:
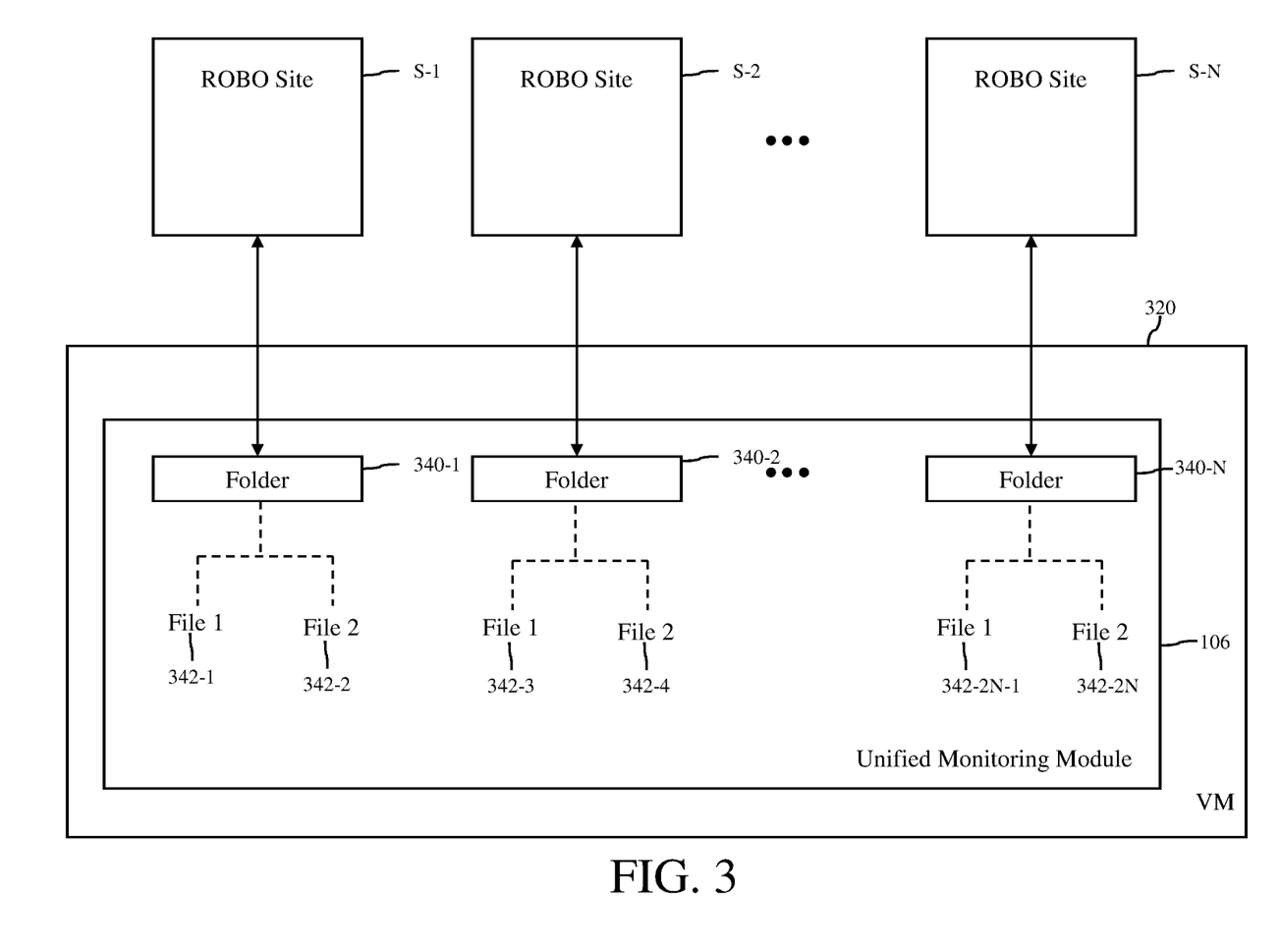
FIG. 3 depicts a data organization of the unified monitoring module in accordance with an embodiment of the invention.

FIG. 3 depicts a data organization of the unified monitoring module 106 in the central management computer 104 in accordance with an embodiment of the invention. In the embodiment depicted in FIG. 3, the unified monitoring module has multiple folders 340-1, 340-2 . . . 340-N(N is a positive integer) for monitoring operation statuses of the multiple ROBO sites S-1, S-2 . . . S-N. The unified monitoring module is installed in a VM 320, which may be the same VM in which an instance of a VMware® vCenter™ executes or a different VM from the VM in which an instance of a VMware® vCenter™ executes. Each folder may contain multiple files 342 for the host computers H-1, H-2 within a particular ROBO site. Each folder may be named with the identification (ID) of a ROBO site and may contain operation status information of the ROBO site. Each file within a folder may be named with the name of the host computer and may contain operation status information of that host computer.

In some embodiments, for each ROBO site, a folder 340 is created in the unified monitoring module 106 to store heartbeat information for the host computers H-1, H-2 within the ROBO site. Each folder may contain heartbeat files 342 for the host computers H-1, H-2 within a particular ROBO site. In the embodiment depicted in FIG. 3, each of the folders 340-1, 340-2 . . . 340-N contains two heartbeat files 342-2X-1, 342-2X (where X is an integer from 1 to N) for two host computers within a particular ROBO site. One of the two host computers may store a copy of an object on the other host computer. Each folder is named with the ID of the ROBO site whose heartbeat information the folder contains. Each file within a folder is named with the name of the host computer whose heartbeat information the file contains. A host computer within an ROBO site is required to regularly access or modify its corresponding heartbeat file within the folder for the ROBO site. For example, each host computer is required to access or modify its corresponding heartbeat file within the folder for the ROBO site according to a predefined schedule (e.g., every 5 seconds or any other suitable time duration). If the unified monitoring module detects that a host computer fails to access or modify its corresponding heartbeat file according to the predefined timetable, the unified monitoring module may determine that the host computer is unreachable. In some embodiments, the unified monitoring module may further determine that the host is unreachable because of a host computer failure. Examples of a host computer failure include a networking interface failure, a processor failure, a storage failure, a storage interface failure, and an operating system failure.

A use case example of the unified monitoring module 106 is described below with reference to FIGS. 4 and 5. In this use case example, the unified monitoring module performs various operations to manage two host computers H-1, H-2 of an ROBO site S-1. Each of the host computers H-1, H-2 stores copies of storage objects, e.g., VM storage objects such as VM home name-space, VM swap, VMDK and delta disk (snapshot) objects, from the other host computer. The unified monitoring module communicates with the host computers H-1, H-2 of the ROBO site S-1 via the management network 102 and maintains heartbeat information of the host computers. For the ROBO site S-1, a folder 440 named "S1-HB" is created and maintained by the unified monitoring module. For the two host computers H-1, H-2 of the ROBO site S-1, a host metadata file 442-1 named "S1-H1-HB" is created for heartbeat information of the host computer H-1 and maintained in the folder named S1-HB. In addition, a host metadata file 442-2 named "S1-H2-HB" is created for heartbeat information of the host computer H-2 and maintained in the folder named S1-HB. Each computer host touches (e.g., accesses) its corresponding metadata file hosted on the unified monitoring module every T seconds (where T is a positive integer) and updates a heartbeat record in the metadata file. In some embodiments, the data structure of the host metadata file of a host computer may include the hostname of the host computer, the network address of the host computer (e.g., the Internet Protocol (IP) address of the host computer), and the last time that the host computer touches (e.g., accesses) its corresponding metadata file.

Figure 4:
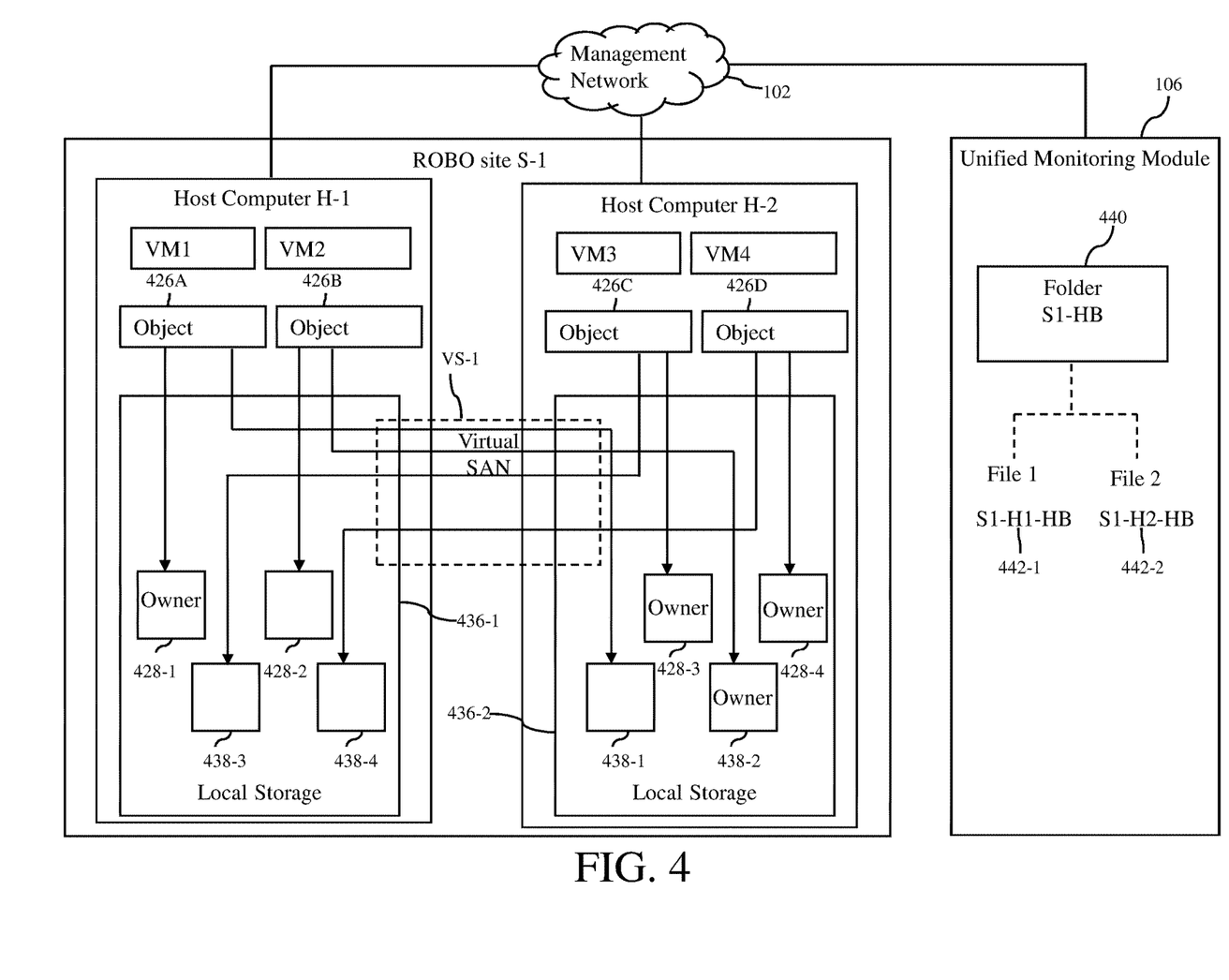
FIG. 4 illustrates a scenario in which the unified monitoring module depicted in FIG. 1 manages two host computers of an ROBO site before a communication disruption in the ROBO site that affects the virtual SAN between the two host computers.

FIG. 4 illustrates a scenario in which the unified monitoring module 106 manages the two host computers H-1, H-2 of the ROBO site S-1 before a communication disruption in the ROBO site S-1 that affects the virtual SAN VS-1 between the two host computers H-1, H-2. In the scenario illustrated in FIG. 4, VM1 and VM2 are running on the host computer H-1 of the ROBO site S-1 and VM3 and VM4 are running on the host computer H-2 of the ROBO site S-1. Each VM object 426A, 426B, 426C or 426D of VM1, VM2, VM3 or VM4 has two replica objects/components, which are copies of the VM objects and stored in different host computers. As shown in FIG. 4, copies of VM objects 426A, 426B in the host computer H-1 are stored in a local storage device 436-1 of the host computer H-1 as local object data replicas 428-1, 428-2, respectively. Copies of VM objects 426A, 426B in the host computer H-1 are also transmitted via the virtual SAN VS-1 and stored in a local storage device 436-2 of the host computer H-2 as remote object data replicas 438-1, 428-2, respectively. In addition, copies of VM objects 426C, 426D in the host computer H-2 are stored in the local storage device 436-2 of the host computer H-2 as local object data replicas 428-3, 428-4, respectively. Copies of VM objects 426C, 426D in the host computer H-2 are also transmitted via the virtual SAN VS-1 and stored in the local storage device 436-1 of the host computer H-1 as remote object data replicas 438-3, 438-4, respectively. The unified monitoring module 106 monitors the heartbeat information of the two host computers H-1, H-2 of the ROBO site S-1 using the local and remote object data replicas stored in the two host computers. Compared to a data protection technique in which each VM object has two replica components and a witness component for helping to decide an ownership role of the VM object, the unified monitoring module 106 eliminates the need for the witness component. Instead of using one witness component for each VM object, the unified monitoring module is used to manage multiple ROBO sites. In addition, instead of using a witness component that is connected to a corresponding VM object by a virtual SAN, the unified monitoring module is connected to the host computers H-1, H-2 of the ROBO site S-1 through the management network 102 that is independent of the virtual SAN. Consequently, the connections between the host computer H-1, H-2 of the ROBO site S-1 and the unified monitoring module will not be affected by a network partition that demolishes or breaks the virtual SAN VS-1 between the host computers H-1, H-2 of the ROBO site S-1.

In some embodiments, a data replica (e.g., the data replica 428-1) contains information (e.g., metadata information) that indicates an ownership role of a certain VM object (e.g., the VM object 426A) belongs to a particular host computer (e.g., the host computer H-1) and is referred to herein as the owner node for that VM object. For example, in the scenario depicted in FIG. 4, the owner node for the object 426A of VM1 is located on the host computer H-1 while the owner nodes for the object 426B of VM2, the object 426C of VM3 and the object 426D of VM4 are located on the host computer H-2. VM1 is running on the host computer H-1 and has an object owner node located on the host computer H-1 as well. VM2 is running on the host computer H-1 and has an object owner node located on the host computer H-2. VM3 and VM4 are running on the host computer H-2 and have object owner nodes located on the host computer H-2 as well. An owner node for an object coordinates access to the object within a network partition. In some embodiments, an object owner coordinates access to the corresponding object, including serializing IO, publishing the configuration state of an object, and implementing object (re)configuration. In some embodiments, when a network partition occurs, an object owner might be reelected or remain the same depending on whether or not the object owner resides on the same host as the VM to which the corresponding object belongs.

Figure 5:
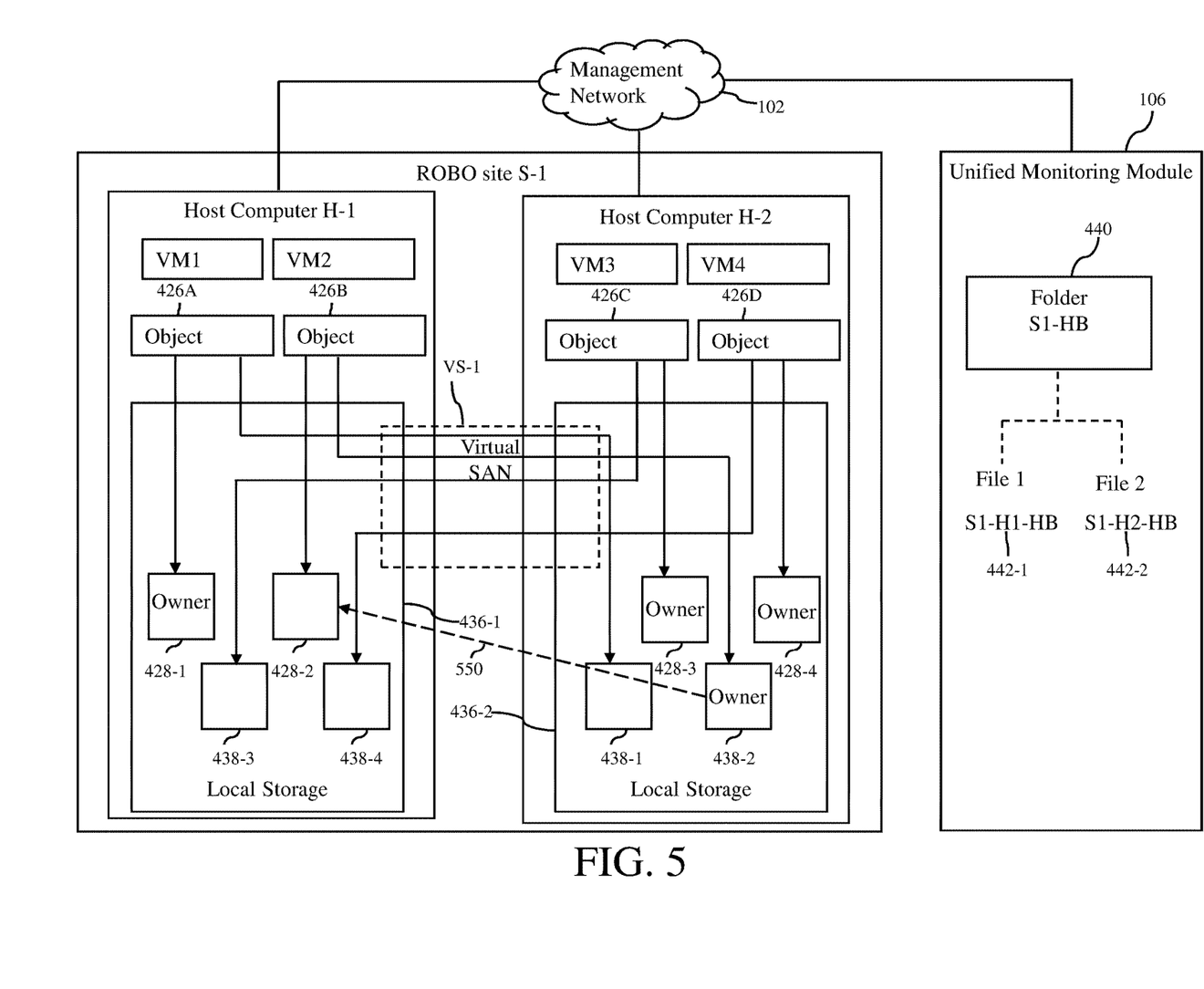
FIG. 5 illustrates a scenario in which the unified monitoring module depicted in FIG. 1 manages the two host computers of the ROBO site after the communication disruption in the ROBO site that affects the virtual SAN between the two host computers.

FIG. 5 illustrates a scenario in which the unified monitoring module 106 manages the two host computers H-1, H-2 of the ROBO site S-1 after a communication disruption in the ROBO site S-1 that affects the virtual SAN VS-1 between the two host computers H-1, H-2. In the scenario depicted in FIG. 5, the virtual SAN VS-1 is demolished or broken such that a network partition between the host computers H-1, H-2 occurs. In this situation, the unified monitoring module 106 monitors the heartbeat information of the two host computers H-1, H-2 of the ROBO site S-1 and determines that the communication disruption in the ROBO site S-1 is caused by the network partition. At the time of the network partition, VM2 is running on the host computer H-1 and has an object owner node located on the host computer H-2. Consequently, the object ownership of the object 426B of VM2 is transferred back to the host computer H-1 (the host computer H-2 releases the object ownership of the object 426B of VM2 while the host computer H-1 acquires/takes the object ownership of the object 426B of VM2), as indicated by the dotted arrow 550 so that VM2 can continue to operate on the host computer H-1 without being interrupted by the network partition.

In a computer system with ROBO sites in which there is a virtual/physical witness component at each ROBO site, when a network partition happens and the witness component is available, VMs' objects are accessible on the host computer that owns the majority of components. For the VMs that were originally running on the host computer which doesn't own the majority of components of their storage objects, these VMs need to be powered off and restarted on the host computer that owns the majority of components. This behavior causes downtime of customer's applications, which is undesirable.

However, if the unified monitoring module 106 determines that the communication disruption in the ROBO site S-1 is caused by a host computer failure (e.g., the host computer H-2 is down), the unified monitoring module notifies the host computer H-1. The host computer H-1 takes the object ownership roles for VM1, VM2, VM3 and VM4 and powers on VM3 and VM4, which were previously running on the host computer H-2, on the host computer H-1. If the host computer H-2 is down, no action needs to be taken by the host computer H-2. If the host computer H-2 is network isolated on the management network 102 and loses communication with the host computer H-1, the host computer H-2 releases object owner roles for the VM objects 426A, 426C, 426D and shuts down VM3 and VM4, which have been restarted on the host computer H-1.

Figure 6:
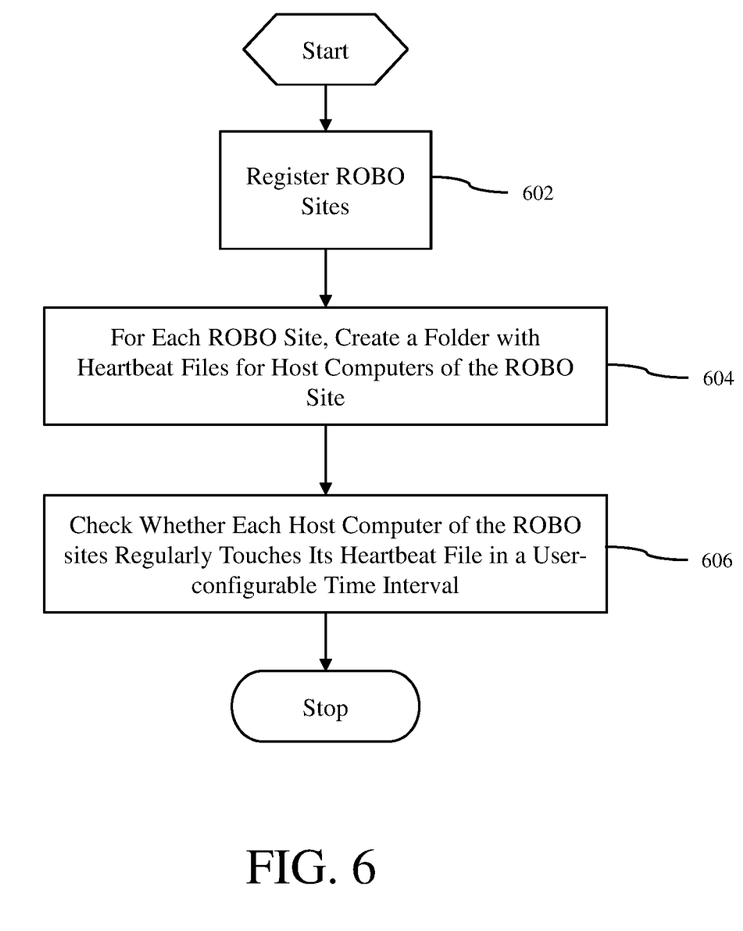
FIG. 6 is a flow diagram of a method for deploying multiple ROBO sites for a computer system in accordance with an embodiment of the invention.

A method for deploying multiple ROBO sites for a computer system in accordance with an embodiment of the invention is described with reference to a flow diagram of FIG. 6. At block 602, the multiple ROBO sites are registered with the unified monitoring module 106, for example, by an administrator. At block 604, for each ROBO site of the multiple ROBO sites, a folder with heartbeat files for host computers of the ROBO site is created in the unified monitoring module. At block 606, whether each host computer of the ROBO sites regularly touches its heartbeat file in a user-configurable time interval is checked by the unified monitoring module.

Figure 7:
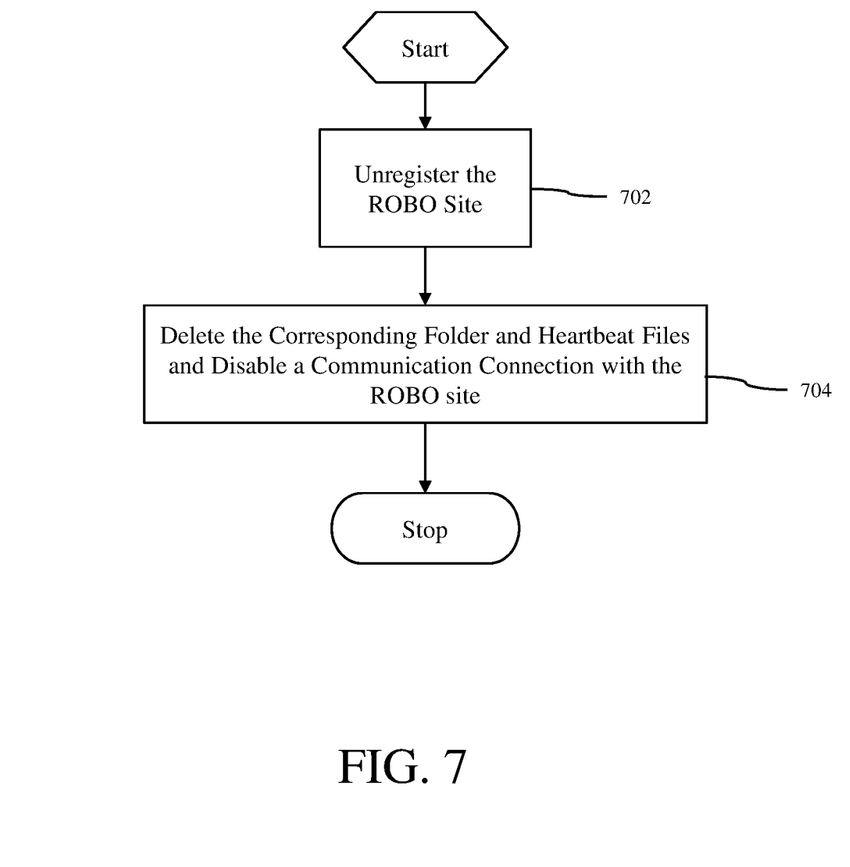
FIG. 7 is a flow diagram of a method for unregistering an ROBO site in accordance with an embodiment of the invention.

A method for unregistering an ROBO site for a computer system in accordance with an embodiment of the invention is described with reference to a flow diagram of FIG. 7. At block 702, the ROBO site is unregistered from the unified monitoring module 106, for example, by an administrator. At block 704, the corresponding folder and heartbeat files of the ROBO site is deleted and the communication connection between the unified monitoring module and the ROBO site is disabled.

Figure 8:
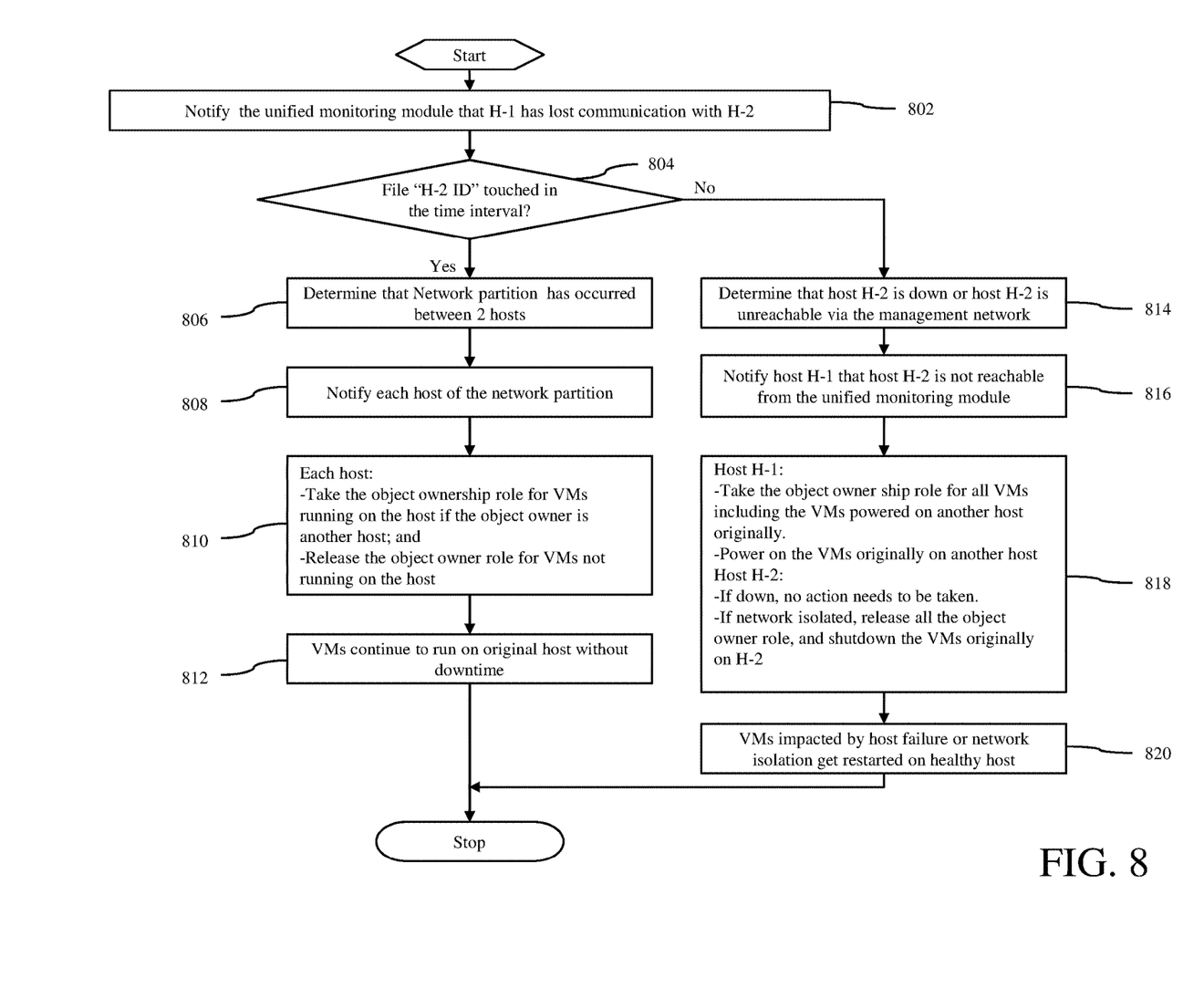
FIG. 8 is a flow chart that illustrates an exemplary operation of the unified monitoring module depicted in FIG. 1.

FIG. 8 is a flow chart that illustrates an exemplary operation of the unified monitoring module 106 depicted in FIG. 1. At step 802, the unified monitoring module is notified that the host computer H-1 of the ROBO site S-1 has lost communication with the host computer H-2 of the ROBO site S-1. At step 804, the unified monitoring module checks whether or not the corresponding heartbeat file "H-2 ID" of the host computer H-2 has been touched in a predefined time interval.

If the corresponding heartbeat file "H-2 ID" of the host computer H-2 has been touched in a predefined time interval, the unified monitoring module 106 determines that a network partition has occurred between the host computers H-1, H-2, at step 806, and notifies the host computers H-1, H-2 of the network partition, at step 808. At step 810, each of the host computers H-1, H-2 takes the object ownership role for any VM running on the host computer if the object owner of the VM is another host computer prior to the network partition and releases the object owner role for any VM that is not running on the host computer. At step 812, VMs continue to run on their original host computers without downtime.

If the corresponding heartbeat file "H-2 ID" of the host computer H-2 has not been touched in a predefined time interval, the unified monitoring module 106 determines that the host computer H-2 is down (a host computer failure has occurred) or the host computer H-2 is unreachable via the management network 102, at step 814, and notifies the host computer H-1 that the host computer H-2 is not reachable from the unified monitoring module, at step 816. At step 818, the host computer H-1 takes the object ownership role for all VMs including the VMs running on the host computer H-2 previously and powers on the VMs on the host computer H-1 that were previously running on the host computer H-2. If the host computer H-2 is down, no action needs to be taken by the host computer H-2. If the host computer H-2 is network isolated, the host computer H-2 releases all the object owner roles and shuts down all of the VMs previously running on the host computer H-2. At step 820, VMs impacted by host failure or network isolation get restarted on the healthy host computer, i.e., the host computer H-1.

In some embodiments, the host computer H-1 sends a query to the unified monitoring module 106 with ROBO site ID and H-2 ID as query parameters. In response to the query, the unified monitoring module locates the metadata file of the host computer H-2 according to the ROBO site ID and the host ID and retrieves the latest touch time of the host computer H-2. If the difference between the current system time and the latest touch time is smaller than a preset threshold, the unified monitoring module determines that a network partition has occurred between the host computers H-1, H-2. If the difference between the current system time and the latest touch time is larger than a preset threshold, the unified monitoring module determines that the host computer H-2 is down (a host computer failure has occurred) or the host computer H-2 is unreachable via the management network 102.

Figure 9:
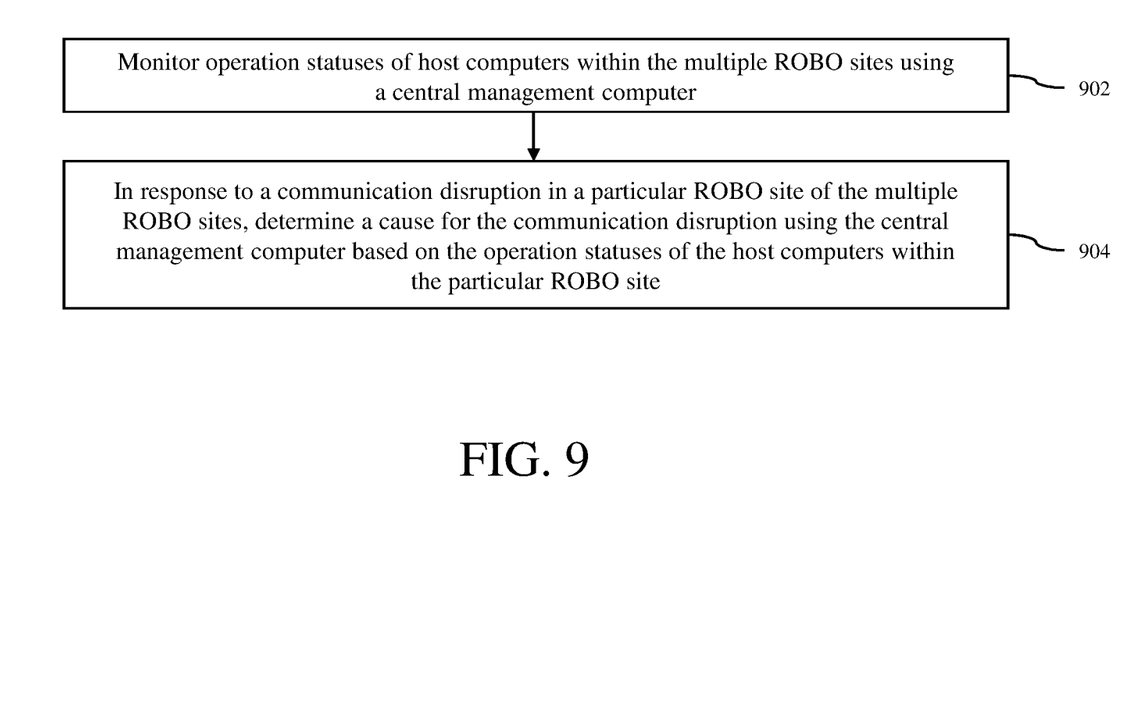
FIG. 9 is a flow diagram of a method for managing multiple ROBO sites in accordance with another embodiment of the invention.

A method for managing multiple ROBO sites in accordance with an embodiment of the invention is described with reference to a flow diagram of FIG. 9. At block 902, operation statuses of host computers within the multiple ROBO sites are monitored using a central management computer. At block 904, in response to a communication disruption in a particular ROBO site of the multiple ROBO sites, a cause for the communication disruption is determined using the central management computer based on the operation statuses of the host computers within the particular ROBO site.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for managing multiple Remote-office and Branch-office (ROBO) sites, the method comprising:
    monitoring operation statuses of host computers within the multiple ROBO sites using a central management computer, wherein each ROBO site of the multiple ROBO sites includes a plurality of host computers, wherein the host computers within each ROBO site are connected to each other by a separate virtual storage area network (SAN), and wherein the host computers within the multiple ROBO sites are connected to the central management computer from a management network that is independent of the virtual SANs;
    in response to a communication disruption in a particular ROBO site of the multiple ROBO sites, determining a cause of the communication disruption as a network partition in the particular ROBO site that breaks a communication within the virtual SAN in the particular ROBO site or as a host computer failure in the particular ROBO site using the central management computer based on the operation statuses of the host computers within the particular ROBO site; and
    in response to determining the cause of the communication disruption as a network partition in the particular ROBO site, causing a first host computer that is hosting at least one client in the particular ROBO site to take, from a second host computer that is hosting at least one other client in the particular ROBO site, an object ownership role of an object of a client executing on the first host computer and continue to execute the client on the first host computer after the network partition, wherein the object is stored in local storage devices of the first and second host computers that support the virtual SAN in the particular ROBO site.

2. The method of claim 1, wherein monitoring the operation statuses of the host computers within the multiple ROBO sites using the central management computer comprises maintaining heartbeat information of the host computers within the multiple ROBO sites.

3. The method of claim 2, wherein maintaining heartbeat information of the host computers within the multiple ROBO sites comprises creating a heartbeat folder with heartbeat files for each of the host computers within the multiple ROBO.

4. The method of claim 2, wherein determining the cause for the communication disruption using the central management computer based on the operation statuses of the host computers within the particular ROBO site comprises determining whether the network partition or the host computer failure has occurred in the particular ROBO site based on the heartbeat information of the host computers within the particular ROBO site.

5. The method of claim 2, wherein the communication disruption in the particular ROBO site indicates that the first host computer within the particular ROBO site is not reachable by the second host computer within the particular ROBO site.

6. The method of claim 5, wherein determining the cause for the communication disruption using the central management computer based on the operation statuses of the host computers within the particular ROBO site comprises determining that the network partition has occurred in the particular ROBO site if heartbeat information of the first host computer indicates that the first host computer accesses or modifies a heartbeat file of the first host computer within a predefined time interval.

7. The method of claim 5, wherein determining the cause for the communication disruption using the central management computer based on the operation statuses of the host computers within the particular ROBO site comprises determining that a host computer failure of the first host computer has occurred if heartbeat information of the first host computer indicates that the first host computer does not access or modify the heartbeat file of the first host computer within a predefined time interval.

8. The method of claim 7, further comprising in response to determining that the host computer failure of the first host computer has occurred, causing the second host computer within the particular ROBO site to take an object ownership role of a client executing on the first host computer if the object ownership role of the client belongs to the first host computer prior to the host computer failure of the first host computer.

9. A non-transitory computer-readable storage medium containing program instructions for managing multiple Remote-office and Branch-office (ROBO) sites, wherein execution of the program instructions by one or more processors causes the one or more processors to perform steps comprising:
   monitoring operation statuses of host computers within the multiple ROBO sites using a central management computer, wherein each ROBO site of the multiple ROBO sites includes a plurality of host computers, wherein the host computers within each ROBO site are connected to each other by a separate virtual storage area network (SAN), and wherein the host computers within the multiple ROBO sites are connected to the central management computer from a management network that is independent of the virtual SANs;
   in response to a communication disruption in a particular ROBO site of the multiple ROBO sites, determining a cause of the communication disruption as a network partition in the particular ROBO site that breaks a communication within the virtual SAN in the particular ROBO site or as a host computer failure in the particular ROBO site using the central management computer based on the operation statuses of the host computers within the particular ROBO site; and
   in response to determining the cause of the communication disruption as a network partition in the particular ROBO site, causing a first host computer that is hosting at least one client in the particular ROBO site to take, from a second host computer that is hosting at least one other client in the particular ROBO site, an object ownership role of an object of a client executing on the first host computer and continue to execute the client on the first host computer after the network partition, wherein the object is stored in local storage devices of the first and second host computers that support the virtual SAN in the particular ROBO site.

10. The non-transitory computer-readable storage medium of claim 9, wherein monitoring the operation statuses of the host computers within the multiple ROBO sites using the central management computer comprises maintaining heartbeat information of the host computers within the multiple ROBO sites.

11. The non-transitory computer-readable storage medium of claim 10, wherein maintaining heartbeat information of the host computers within the multiple ROBO sites comprises creating a heartbeat folder with heartbeat files for each of the host computers within the multiple ROBO.

12. The non-transitory computer-readable storage medium of claim 10, wherein determining the cause for the communication disruption using the central management computer based on the operation statuses of the host computers within the particular ROBO site comprises determining whether the network partition or the host computer failure has occurred in the particular ROBO site based on the heartbeat information of the host computers within the particular ROBO site.

13. The non-transitory computer-readable storage medium of claim 10, wherein the communication disruption in the particular ROBO site indicates that the first host computer within the particular ROBO site is not reachable by the second host computer within the particular ROBO site.

14. The non-transitory computer-readable storage medium of claim 13, wherein determining the cause for the communication disruption using the central management computer based on the operation statuses of the host computers within the particular ROBO site comprises determining that the network partition has occurred in the particular ROBO site if heartbeat information of the first host computer indicates that the first host computer accesses or modifies a heartbeat file of the first host computer within a predefined time interval.

15. The non-transitory computer-readable storage medium of claim 13, wherein determining the cause for the communication disruption using the central management computer based on the operation statuses of the host computers within the particular ROBO site comprises determining that a host computer failure of the first host computer has occurred if heartbeat information of the first host computer indicates that the first host computer does not access or modify the heartbeat file of the first host computer within a predefined time interval.

16. The non-transitory computer-readable storage medium of claim 15, wherein the steps further comprise in response to determining that the host computer failure of the first host computer has occurred, causing the second host computer within the particular ROBO site to take an object ownership role of a client executing on the first host computer if the object ownership role of the client belongs to the first host computer prior to the host computer failure of the first host computer.

17. A computer system for managing multiple Remote-office and Branch-office (ROBO) sites comprising:
   a central management computer configured to:
      monitor operation statuses of host computers within the multiple ROBO sites, wherein each ROBO site of the multiple ROBO sites includes a plurality of host computers, wherein the host computers within each ROBO site are connected to each other by a separate virtual storage area network (SAN), and wherein the host computers within the multiple ROBO sites are connected to the central management computer from a management network that is independent of the virtual SANs;

in response to a communication disruption in a particular ROBO site of the multiple ROBO sites, determine a cause of the communication disruption as a network partition in the particular ROBO site that breaks a communication within the virtual SAN in the particular ROBO site or as a host computer failure in the particular ROBO site based on the operation statuses of the host computers within the particular ROBO site; and in response to determining the cause of the communication disruption as a network partition in the particular ROBO site, cause a first host computer that is hosting at least one client in the particular ROBO site to take, from a second host computer that is hosting at least one other client in the particular ROBO site, an object ownership role of an object of a client executing on the first host computer and continue to execute the client on the first host computer after the network partition, wherein the object is stored in local storage devices of the first and second host computers that support the virtual SAN in the particular ROBO site.

18. The computer system of claim 17, wherein the central management computer is further configured to maintain heartbeat information of the host computers within the multiple ROBO sites.

19. The computer system of claim 18, wherein the central management computer is further configured to create a heartbeat folder with heartbeat files for each of the host computers within the multiple ROBO.

20. The computer system of claim 18, wherein the central management computer is further configured to, in response to the communication disruption in the particular ROBO site of the multiple ROBO sites, determine whether the network partition or the host computer failure has occurred in the particular ROBO site based on the heartbeat information of the host computers within the particular ROBO site.

21. The computer system of claim 18, wherein the communication disruption in the particular ROBO site indicates that the first host computer within the particular ROBO site is not reachable by the second host computer within the particular ROBO site.

22. The computer system of claim 21, wherein the central management computer is further configured to, in response to the communication disruption in the particular ROBO site of the multiple ROBO sites, determine that the network partition has occurred in the particular ROBO site if heartbeat information of the first host computer indicates that the first host computer accesses or modifies a heartbeat file of the first host computer within a predefined time interval.

23. The computer system of claim 21, wherein the central management computer is further configured to, in response to the communication disruption in the particular ROBO site of the multiple ROBO sites, determine that a host computer failure of the first host computer has occurred if heartbeat information of the first host computer indicates that the first host computer does not access or modify the heartbeat file of the first host computer within a predefined time interval.

24. The computer system of claim 23, wherein the central management computer is further configured to, in response to determining that the host computer failure of the first host computer has occurred, cause the second host computer within the particular ROBO site to take an object ownership role of a client executing on the first host computer if the object ownership role of the client belongs to the first host computer prior to the host computer failure of the first host computer.

25. The method of claim 1, wherein causing the first host computer in the particular ROBO site to take, from the second host computer in the particular ROBO site, the object ownership role of the object of the client executing on the first host computer comprises causing a data replica of the object of the client to contain metadata information that indicates the object ownership role of the object of the client belongs to the first host computer.

26. The method of claim 1, further comprising in response to determining the cause of the communication disruption as a host computer failure in the particular ROBO site using the central management computer based on the operation statuses of the host computers within the particular ROBO site, causing a particular host computer in the particular ROBO site to take, from a failed host computer, an object ownership role of objects of clients running on the failed host computer and causing the particular host computer to power on the clients in the particular host computer that were originally running on the failed host computer.

* * * * *